United States Patent
Rivking et al.

[15] 3,667,687
[45] June 6, 1972

[54] APPARATUS FOR PRODUCING HIGH EXPANSION FOAM

[72] Inventors: Leo E. Rivking, Springfield; Adolph Blum, Scotch Plains, both of N.J.

[73] Assignee: The Mearl Corporation, West Roselle Park, N.J.

[22] Filed: Aug. 10, 1970

[21] Appl. No.: 62,429

[52] U.S. Cl. ......................239/553.3, 169/15, 261/DIG. 26
[51] Int. Cl. ........................................B05b 1/14, F23d 13/44
[58] Field of Search ................239/553.3, 590.3, 425.5, 343, 239/427, 427.5; 261/DIG. 26; 169/15, 14

[56] References Cited

UNITED STATES PATENTS

| | | | |
|---|---|---|---|
| 3,419,082 | 12/1968 | O'Regan et al. | 239/553.3 X |
| 2,597,913 | 5/1952 | Webster | 261/DIG. 26 |
| 2,774,583 | 12/1956 | Haftke | 169/15 X |
| 2,829,874 | 4/1958 | Freeman | 239/590.3 |
| 3,342,271 | 9/1967 | Anthony, Jr. | 169/15 |
| 3,388,868 | 6/1968 | Watson et al. | 239/553.3 |
| 3,424,250 | 1/1969 | Thomae | 169/15 |
| 3,446,285 | 5/1969 | Hout | 239/553.3 |
| 3,533,473 | 10/1970 | Jamison | 169/15 X |

Primary Examiner—Lloyd L. King
Attorney—Ostrolenk, Faber, Gerb and Soffen

[57] ABSTRACT

Foam producing apparatus comprising eduction means using compressed gas to sweep and educe lower pressure gas or gas laden with dust contaminants or other materials toward a porous foam forming barrier surface; foam forming solution spray nozzles direct such solution to wet the barrier surface; the gas creates foam at the screen, with the foam being moved beyond the screen by the gas.

8 Claims, 3 Drawing Figures

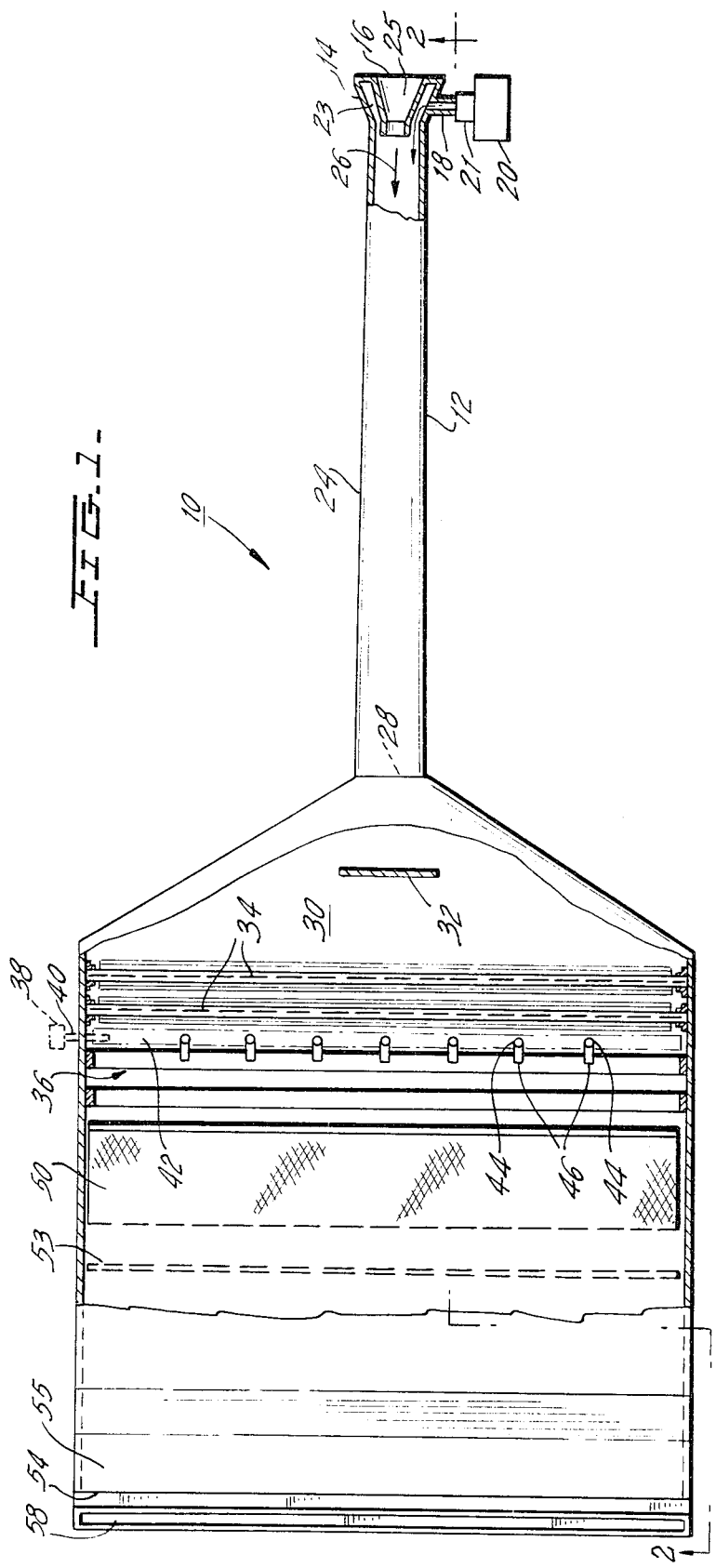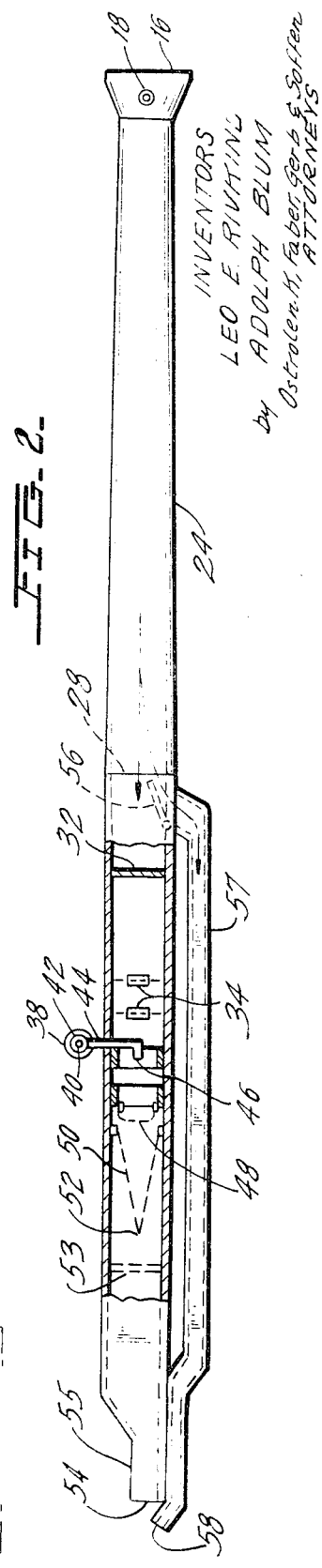

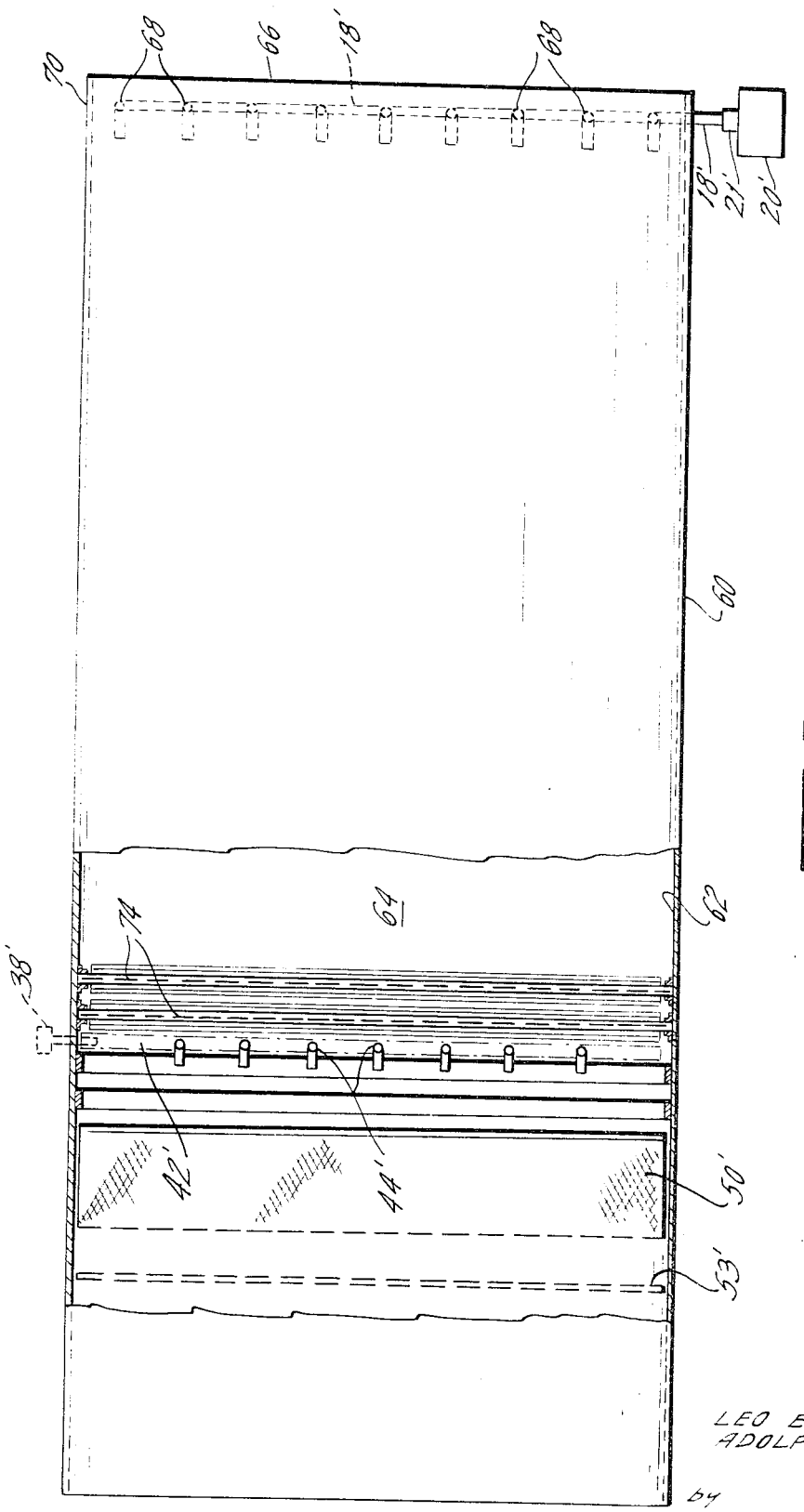

APPARATUS FOR PRODUCING HIGH EXPANSION FOAM

BACKGROUND OF THE INVENTION

This invention relates to an apparatus for producing high expansion foam, in general, and in particular to such an apparatus which uses educed gas for producing the foam.

Aqueous foams have many uses, including fire fighting, collecting particulate matter, scrubbing dust, smoke and similar pollutants from air or gas streams, controlling frost in nurseries, farms and orchards and distributing foamed mulches. In a particular application of the present invention, foam entraps dust and fine debris developed during the operation of continuous coal cutting and mining machines.

Conventionally, high expansion aqueous foam is generated by continuously discharging a spray of a dilute foaming agent solution, well known in the art, against a porous barrier material, while simultaneously directing a stream of relatively low pressure inert gas or air against the liquid films that form across the openings of the wetted porous barrier surface. The air flow distends the liquid films until they separate from the barrier surface and form a coherent mass of bubbles, which are continuously discharged as high expansion foam.

Most commonly, the low pressure gas, which is directed toward the porous barrier, is supplied under the influence of a motor driven fan or blower or is supplied wholly from a low pressure compressed gas source.

Such prior art units have drawbacks. A motor driven apparatus has moving parts, which can eventually malfunction. Furthermore, under highly flammable conditions, e.g. coal mining or fire fighting in the presence of flammable vapors, operation of a motor might ignite an undesired fire. Further still, a motorized device requires connection to a power supply, which might be unavailable in the vicinity where the foam is required, e.g., in fire fighting applications. Where a fan or blower supplies gas under pressure, the design, shape and configuration of the apparatus must fit the size and shape of the fan or the blower, which precludes use of such apparatus in some closely limited areas.

Where a source of low pressure compressed gas is the sole supply of foam generating gas, considerable quantities of compressed gas are used in generating the foam. This requires a large volume and, therefore, expensive supply of compressed gas, or requires a motor for compressing gas, with the above noted drawbacks of motors.

Also common are aspirating foam makers, which educe gas required for foam making by discharging a spray of foam forming solution at a relatively high pressure through one or more jets into a plenum prior to contacting the foam forming barrier. This plenum is open to the atmosphere. Operating on the principle of a Venturi device, the high velocity spray of solution creates a region of low pressure, below atmospheric in the plenum, thereby educing atmospheric air, which is turbulently mixed with the solution producing foam. However, the efficiency of the liquid aspiration devices is rather low since the amount of air that can be educed is dependent upon such factors as the pressure of the liquid stream, the number of jets dispensing liquid, and the characteristics of the liquid spray pattern, including the velocities and sizes of the spray droplets. Hence, foam expansions developed by aspirating devices are often limited to a maximum expansion ratio of about 400:1. Furthermore, the designs, sizes and shapes of aspirating type foam forming apparatus, such as a fan operated apparatus, is controlled in part by the shape of the aspirating spray pattern.

SUMMARY OF THE INVENTION

The present invention provides a more efficient foam generator, which employs a compressed gas or air powered eductor to entrain a large supply of low pressure gas, e.g. ambient atmospheric air, dust laden air, contaminated gas, gas laden with vapors, liquid mist or the like, for the generation of high expansion foam. Gas under pressure is directed through an eduction means, which includes an inlet that opens from the low pressure gas. The moving compressed gas draws the low pressure gas into the eduction means inlet and mixes with it. Now, at a lower pressure, the combined gases travel through a duct section of the eduction means and impinge upon the liquid film, which was applied to the porous barrier surface by a liquid spray nozzle means. Interposed between the exit from the eduction means and the barrier surface is a gas distribution means, which distributes the combined gases so that they impinge at a substantially uniform velocity and pressure over the enter area of the barrier surface. Hence, while the educed air might be travelling along a pathway, which is narrower or differently dimensioned than the barrier surface, the diffusing means will redirect the gas flow so that it impinges substantially uniformly over the entire barrier surface.

The above described apparatus, including the eduction means, permits a foam forming apparatus, and particularly its wetted porous barrier surface, to be designed having various shapes and dimensions. For example, a foam generating apparatus has been used, which is only 5 inches high, but 40 inches wide. This permits the apparatus to be inserted through variously dimensioned openings, and to be used in closely limited spaces and, therefore, to provide foam in many different applications. In addition to conventional circular or square cross sections for generators, various irregular or asymmetric shapes may be provided.

The simple compressed gas powered eductor causes the major portion of gas required for foam production, up to as much as 98 percent of the gas by volume, for example, to consist of the educed low pressure gases. Foams can be produced with expansion ratios in a range from 100:1 up to over 1,200:1, for example. Even the high expansion ratios are economically obtained with only a minimum quantity of compressed gas. No motor driven fans or blowers are required. Simple low pressure foam solution spray nozzles may be employed for wetting the porous barriers. This also permits use of smaller, lower cost pumps and motors for pressurizing the foam forming solution lines. This is to be contrasted with the high pressure jets and larger, more expensive pumps and motors required for the aspirating liquid type devices.

An additional benefit of the invention arises from the large volume of atmospheric air educed. A portion of this can be redirected external to the chamber containing the nozzle means, distribution means and the porous barrier surface so as to discharge in the same forward direction and to serve as a moving fluid bed on which the generated foam can be carried and thereby projected for considerable distances beyond the barrier surface.

By various mechanical devices for shaping the stream of foam, the foam can be directed into many otherwise inaccessible spaces, e.g., in fire fighting in closed areas and in mining coal.

Accordingly, it is an object of the invention to provide an improved foam generating apparatus.

It is another object of the invention to provide a simplified foam generating apparatus for use in many applications.

These and other objects of the present invention will become apparent from the following description of the accompanying drawings, in which:

SUMMARY OF DRAWINGS:

FIG. 1 is a top, plan view, partially cut away, of a foam generating apparatus designed in accordance with the present invention;

FIG. 2 is a view of the foam generating apparatus of FIG. 1, also partially cut away, in the direction of arrows 2 in FIG. 1; and FIG. 3 is a top plan view, also partially cut away, of an alternate embodiment of foam generating apparatus in accordance with the present invention.

DESCRIPTION OF DRAWINGS AND INVENTION

Turning to FIG. 1, foam generating apparatus 10 includes an eductor means 12 which comprises a conventional eductor nozzle 14 with an inlet 16, which opens to the ambient atmosphere, usually comprised of atmospheric air. Nozzle 14 tapers narrower away from inlet 16. Connected into the tapered section of nozzle 14 is compressed gas inlet conduit 18, which connects with a conventional supply 20 of compressed gas, e.g., a tank of compressed air or a pressurized air line from a compressor. Appropriate adjustable valving and pressure regulating devices (not shown) control the quantity of compressed air feed, and a filtering device 21 is used to clean this compressed air feed into nozzle 14. Nozzle 14 is a Venturi type including a chamber with an annular discharge opening 23 from which the driving gas stream discharges downstream through eductor column 24 in the direction of arrow 26. As the compressed gas under elevated pressure moves into nozzle 14, it aspirates atmospheric air through nozzle inlet 16 and central opening 25, and the combined gas stream is impelled along column 24. This makes available large volumes of gases for the production of highly expanded foam at high rates of generation. For example, up to fifty times as much atmospheric air, as there is compressed air, is entrained. Column 24 has an outlet 28, which opens into the gradually widening foam generating chamber 30. The moving air stream from column 24 enters chamber 30.

In the embodiment shown in FIG. 1, chamber 30 widens, so as to distribute incoming air over the entire to be described foam forming barrier surface 50. Immediately downstream of exit 26 is optionally positioned a baffle plate 32, which redistributes the incoming air and prevents air blasting through the center of screens 34 and barrier surface 50, to be described. This assists screens 34 in assuring a uniform velocity and pressure front for the gases impinging upon barrier surface 50.

Near the upstream end of the widened portion of chamber 30 is secured at least one distribution screen 34, which operates in the manner described above. Each gas distribution screen 34 comprises a plurality of fins, vanes and/or air foils, including woven wire cloths of various sizes and porosities and perforated sheet metal of various patterns, shapes and types, which can be oriented to appropriately block or redirect the gas stream to obtain the uniform pressure and velocity front described above.

Downstream of screen 34 is foam forming solution spray nozzle means 36. This means includes a source 38 of foam forming solution, including a solution reservoir and conventional means for pumping the solution at uniform rates of flow.

Many foam forming solutions are known in the art and the choice of a solution to be dispensed depends upon the application for the foam. For example, for fire fighting, the foam forming solution may be comprised of ingredients described in U.S. Pat. No. 3,258,423. Modification of this and other foam forming solutions, in ways well known in the art, will produce foams for different purposes. For dust allayment in a coal mine, it may be desirable to use a foam forming solution, which produces foam of low stability. This prevents filling of the working area with a long lasting foam, which would interfere with the visibility of the work area and with the comfort of the operators of the mining equipment.

Foam forming solution is pumped through conduit 40 and through dispensing and support conduit 42, to the latter of which are connected a plurality of spaced apart conventional spray nozzles 44. While a single nozzle would be sufficient in some applications, a series of nozzles is illustrated for maintaining a substantially uniform spray across the entire barrier surface 50. The use of a number of nozzles is rendered necessary in the apparatus of FIG. 1 by the particular substantially flat embodiment of foam forming apparatus there illustrated. Each nozzle 44 includes a spray tip 46, which is directed downstream toward foam forming barrier surface 50. Spray nozzles 44, and particularly nozzle tips 46, are chosen to provide a spray having the required geometrical configuration, e.g. a conical, flat, square or rectangular, etc. spray. Nozzles 44 are positioned so that under normal operating conditions, they each wet a preselected area of surface 50 with slight overlap by neighboring nozzles.

Immediately downstream of nozzle tips 46 is supported the foam forming barrier surface 50, with openings of a size to permit the formation of optimum size and usefulness foam bubbles. Surface 50 is V-shaped, with apex 52 facing downstream. The V-shaping increases the area of the surface, thereby causing more foam to be generated. The surface may additionally or alternatively be flat, curved or accordion pleated, or otherwise shaped to provide the surface area over which the foam can be generated.

Surface 50 may be comprised of any sufficiently rigid or rigidly supported appropriate porous medium, including various types of perforated sheet metal, woven wire cloth, synthetic fabrics, porous sintered metallic materials or layers of column packing material, such as beads, saddles or rings, any of which may be sandwiched between screening materials.

The foam forming solution spreads over and wets surface 50, forming films across the openings therein. The continuously flowing gas distends the films after they are formed, causing the formation of bubbles, which coalesce to form a foam. This foam is then propelled forward through the remainder of the apparatus.

If additional refinement of the foam to form smaller bubbles is required for a particular application, additional layers 53 of porous media, such as those previously described for barrier surface 50, may be located immediately downstream of surface 50. Alternatively, refinement of the foam may be accomplished by appropriately changing the porosity of surface 50.

The foam then exits through outlet 54 and is directed toward the area where it is required. Outlet 54 may be shaped to direct the foam upward, downward or sideward by means of vanes, channels or deflectors, which impart a directional change to the foam stream.

In addition, it may be desirable to increase the velocity of the foam stream to cause it to be projected a considerable distance beyond outlet 54. Techniques available for accomplishing this include decreasing the cross-sectional area of the generator at outlet 54, e.g. by gradually narrowing the height of the foam generator near the outlet, as shown at 55.

Since a considerable quantity of air is being moved downstream through the apparatus, some of it may be deflected by adjustable deflector 56 into bypass conduit 57, which will bypass the deflected air around screens 50, 53 and carry the air slightly beyond air outlet 58, where the moving air will provide assistance for further projection of the exiting foam stream.

The embodiment of FIGS. 1 and 2 illustrates a particular configuration for a foam forming apparatus, showing a unit having short height and great width. Such an odd shape is obtainable through use of the present invention. Other geometric configurations, which are uniquely designed for a particular application, may be used.

FIG. 3 illustrates an alternate embodiment of foam forming apparatus using the present invention, but employing a different eduction means. Instead of narrow column 24, eduction means 60 includes wide, flat chamber 62 having the same general configuration as chamber 64 in which the gas distribution screen means and foam forming barrier surface are located. Eduction chamber 62 also includes inlet 66 opening to the atmosphere. Inlet 66 extends across the entire width of chamber 62. A number of compressed gas inlet nozzles 68, all communicating with a conventional compressed gas pressure source 20' communicate through conduit 18' with inlet nozzle 70 to chamber 62. Appropriate aiming of nozzle 68 and shaping of nozzle 70 causes the compressed gas to be directed downstream through chamber 62 toward chamber 64. The compressed gas draws in ambient atmospheric gas through inlet 66, entrains this gas and sweeps the combined gas downstream toward chamber 64. In chamber 64 are appropriate air distribution screens 74 having the same function as screens 34 in FIG. 1.

The remainder of the foam forming apparatus in FIG. 3 is the same as in the embodiment of FIG. 1, and corresponding elements in FIG. 3 are numbered with corresponding prime (') numbers to the elements in FIG. 1.

FIG. 3 illustrates that there are a number of different designs available for an eduction means in accordance with the invention and that the significant aspect of the eduction means is that compressed gas exits from the nozzles and educes atmospheric air or gases and that the resulting mixture moves downstream toward the foam forming barrier surface.

In a further variation, not illustrated, of the eduction means of FIG. 3, the compressed air can be directed to blast through a unitary slit, rather than through air nozzles 68, for obtaining the eduction effect. Various other types of air jet arrangements, blast nozzles and air movers, all generically referred to as gas discharging porting means, which are apparent to one skilled in the art, may be used for the eductor in accordance with the teachings herein.

As a further variation in the present apparatus, for entrapping dust, particulate pollutants, smoke, and noxious vapors, the foam generator may be arranged so that the undesired material is aspirated or drawn directly into the foam generator, in place of ambient atmospheric air, by means of the compressed air stream, and so that this material is then entrained with the compressed air to produce the foam. The foam could then be collected, the wetted pollutants removed or treated and, if desired, the foaming solution could be recycled through the foam generator.

According to the usual practices in the foam producing art, the stability of foams can be controlled to the desired level by varying the air flow rate, the solution flow rate, the concentration of the foaming agent in the solution, the chemical nature of the foaming agent, the porosity and construction of the foam forming barrier materials on the foam refining screen materials.

In a particular application of the present invention, two similar foam generators have been mounted on a continuous mining machine in a bituminous coal mine to provide a continuous broad stream of foam to the machine cutter wheels and to provide a blanket of foam to cover the coal mine working surface. The large volume of dust generated during coal cutting is captured, wet and agglomerated by the foam. Reducing the dust improves visibility and reduces harm from coal dust. In addition, during mining of coal, sparks are often produced when the cutting bits strike hard rock formations. Cutting under a blanket of foam reduces the sparking potential, thereby reducing the hazards of igniting methane pockets or causing coal dust explosions. Moreover, the aqueous foam serves to cool the cutting bits, thereby prolonging their useful lives.

In practice, a further benefit has resulted in that the coal mined under a foam blanket can be moved by the gathering and conveying mechanisms of the mining machine and dumped into hopper cars or onto conveyor belts without causing the severe dust conditions which had heretofore accompanied these transfers and movements. Additional foam might be applied at critical transfer points, particularly when coal is dumped.

For dust allayment purposes in a coal mine, it may be desirable to use the above described low stability foam, in order to prevent filling of the working area with a long lasting foam, which would interfere with visibility and the comfort of the operators of the mining equipment. After the foam bubbles collapse, the wetted dust and fine coal particles may be collected and salvaged through a conventional pumping and filtering or setting operation.

For certain fire fighting applications, the present invention offers a stream of foam with a longer and more variable trajectory than heretofore has been possible. This trajectory can be varied by appropriate shaping, movement and redirection of the foam outlet chamber, and by varying the rate of flow of compressed air into the unit. This is an important advantage for stubborn fires in inaccessible locations. The variety of possible shaped outlets also makes possible simultaneous fire fighting foam distribution over a wide or small area in much the same manner as water sprays from an automatic fire extinguishing sprinkler system. By connecting to individual foam generators, heat actuated valves or other detection and actuating devices, the foam discharge may be controlled and confined to the fire area.

While a number of embodiments of the present invention have been described, many variations and modifications will now be apparent to those skilled in the art. Therefore, this invention is to be limited, not by the specific disclosure herein, but only by the appended claims.

We claim:

1. In a foam generating apparatus comprising,
   a foam forming porous barrier surface to which foam producing solution is directed and which is wetted with the solution;
   spray nozzle means directed at said barrier surface for carrying and for spraying foam producing solution at said barrier surface;
   the improvement comprising,
   a means for moving foam producing gas toward and through said barriers surface to generate foam from solution on said surface; said gas moving means comprising, gas eduction means communicating with and directed toward said barrier surface; means for supplying gas at elevated pressure; means for directing the gas which is at elevated pressure through said eduction means toward said barrier surface;
   said eduction means including an inlet communicating with a supply of gas at a less elevated pressure; said inlet having an opening which gradually narrows away from said inlet; said gas supplying means being connected with said nozzle means inward from said inlet; the elevated pressure gas serving to educe the gas which is at a less elevated pressure through said inlet, and to propel the mixed gas stream toward said barrier surface;
   said spray nozzle means being closer to said barrier surface than are said eduction means inlet and the connection of said gas supplying means and said eduction means.

2. In the foam generating apparatus of claim 1, the improvement further comprising,
   said elevated gaseous pressure supply means comprises a source of gas under pressure.

3. In the foam generating apparatus of claim 1, the improvement further comprising,
   said eduction means being shaped for directing the gas passing through said eduction means to sweep over and past said spray nozzle means.

4. In the foam generating apparatus of claim 3, said foam generating apparatus having an outlet; the improvement further comprising,
   by means of the gas passing through said eduction means, the generated foam is pushed through said apparatus outlet;
   a bypass conduit communicating with said eduction means between its said inlet and said spray nozzle means and being shaped to carry educed gas beyond said eduction means outlet; said bypass conduit having an outlet positioned to emit educed gas beyond said apparatus outlet to blow the generated foam.

5. In the foam generating apparatus of claim 1, the improvement further comprising,
   said gas supplying and directing means being adapted to cause the gas to pass through said barrier surface at sufficiently elevated velocity to propel the generated foam beyond said barrier surface, which velocity is also below the velocity at which the gas will interfere with foam generation.

6. In the foam generating apparatus of claim 1, the improvement further comprising, a distribution screen means interposed between said barrier surface and said eduction means for distributing the gas from said eduction means so that it impinges at a substantially uniform velocity and pressure over the entire area of said barrier surface.

7. In the foam generating apparatus of claim 6, the improvement further comprising,
said barrier surface being shaped with a shape selected from the group consisting of V-shaping, accordian pleating, flat shaping and curved shaping, thereby to provide adequate surface area over which a foam forming solution might be sprayed and from which foam might be generated.

8. In the foam generating apparatus of claim 1, the improvement further comprising,
said eduction means inlet communicating with the gas in the ambient atmosphere adjacent to said inlet, whereby that atmosphere provides a supply of gas at a less elevated pressure.

* * * * *

PO-1050
(5/69)

UNITED STATES PATENT OFFICE
CERTIFICATE OF CORRECTION

Patent No. 3,667,687          Dated June 6, 1972

Inventor(s) Leo E. Rivkind et al

It is certified that error appears in the above-identified patent and that said Letters Patent are hereby corrected as shown below:

Title Page, Inventors, "Leo E. Rivking" should read:
-- Leo E. Rivkind --

Signed and sealed this 17th day of October 1972.

(SEAL)
Attest:

EDWARD M. FLETCHER, JR.          ROBERT GOTTSCHALK
Attesting Officer          Commissioner of Patents